United States Patent [19]

Kito et al.

[11] Patent Number: 4,554,565
[45] Date of Patent: Nov. 19, 1985

[54] METHOD OF PRODUCING REVERSIBLE THERMOCHROMIC DISPLAY

[75] Inventors: Tutomu Kito, Gifu; Norikazu Nakasuji, Aichi; Takashi Kataoka, Aichi; Hiroshi Inagaki, Aichi; Yutaka Shibahashi, Aichi, all of Japan

[73] Assignee: Pilot Ink Co., Ltd., Aichi, Japan

[21] Appl. No.: 597,292

[22] Filed: Apr. 6, 1984

[51] Int. Cl.$^4$ ................................................ B41M 5/18
[52] U.S. Cl. .................................... 346/201; 346/202; 346/204; 346/206; 346/226; 427/152; 428/199; 428/913
[58] Field of Search ............... 346/200, 226, 201, 202, 346/204, 206; 428/195, 199, 913; 427/150, 151, 152

[56] References Cited

U.S. PATENT DOCUMENTS

| | | | |
|---|---|---|---|
| 4,028,118 | 6/1977 | Nakasuji et al. | 106/21 |
| 4,322,466 | 3/1982 | Tomlinson | 346/204 |
| 4,423,116 | 12/1983 | Fox | 428/913 |

Primary Examiner—Bruce H. Hess
Attorney, Agent, or Firm—Sughrue, Mion, Zinn, Macpeak & Seas

[57] ABSTRACT

A method for producing a reversible thermochromic display composed of multiple, overlapping color images. In accordance with the invention, a plurality of overlapping colored image layers are formed on a support, at least one of which layers provides a reversible thermochromic image. Each of the images on the various layers has a different visual density, and at least one reversible thermochromic image changes color at a temperature below or above a predetermined temperature and provides a color which is more intense and more easily discernible than the colors of the other ones of the images.

3 Claims, 7 Drawing Figures

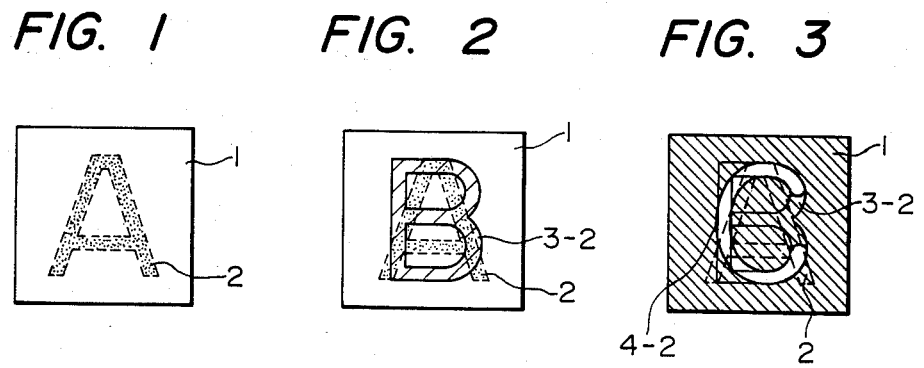
FIG. 1  FIG. 2  FIG. 3
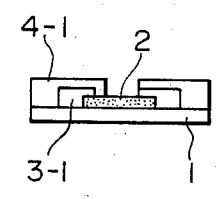 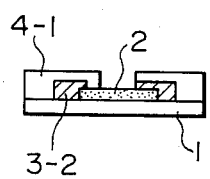 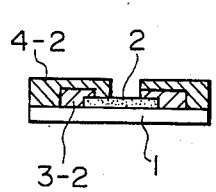
FIG. 4  FIG. 5  FIG. 6
FIG. 7
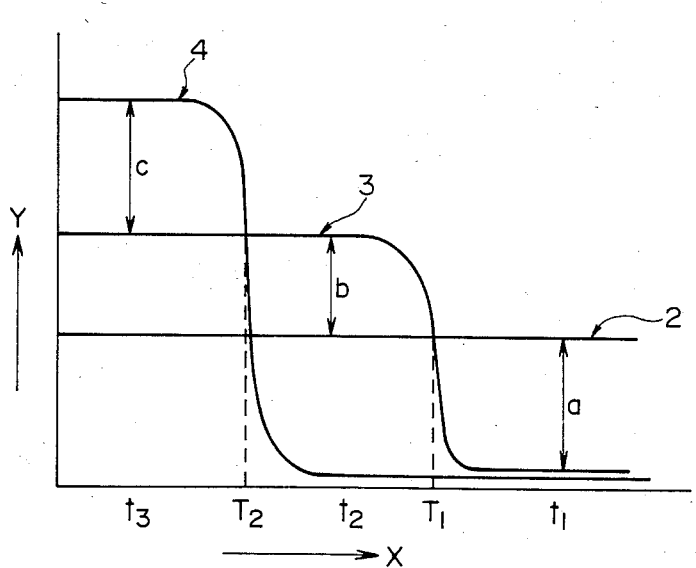

METHOD OF PRODUCING REVERSIBLE THERMOCHROMIC DISPLAY

BACKGROUND OF THE INVENTION

The present invention relates to method for producing a reversible thermochromic display. More particularly, the invention relates to a method for producing a reversible thermochromic display composed of two or more overlapping layers of image formed on a support, at least one of which layers provides a reversible thermochromic image, wherein the colored images on the respective layers have different visual densities and the reversible thermochromic image changes color at a temperature lower or higher than a predetermined point and provides a color that is more intense and more easily discernible than the pale color of the other images.

Reversible thermochromic materials are known (see U.S. Pat. No. 4,028,118), and printing inks prepared from these materials have been applied to various articles to construct temperature indicators, ornamental objects and toys that reversibly change or develop color at well-defined temperatures. However, in most commercial products that provide the viewing of multiple images at different temperatures, images that develop color in the desired temperature regions are formed on a support side by side. This not only requires a large area, but also is unappealing for the viewer.

SUMMARY OF THE INVENTION

Accordingly, the primary object of the present invention is to provide an improved methd for producing reversible thermochromic display composed of a plurality of overlapping image layers which are selectively viewable at different temperatures.

The method for producing a reversible thermochromic display of the present invention includes steps of forming two or more overlapping image layers on a support, at least one of which layers provides a reversible thermochromic image. The colored images on the respective layers have different visual densities so that the composite reversible thermochromic image changes color at a temperature lower or higher than a predetermined point and provides a color that is more intense and more easily discernible than the pale color of the other images.

According to the present invention, any material including a sheet that has good receptivity to ink or the like may be effectively used as the support. Materials which are white or pale in color are preferred since they facilitate the viewing of images of various colors. For the purpose of the present invention, at least one of the image layers must provide a reversible thermochromic image. The other layers may provide a nonthermochromic image. If more than one layer of reversible thermochromic image is employed, the respective images must have different thermochromic temperatures and the resulting color images must have different visual densities. If a nonthermochromic image is used, that layer is preferably paler than the colored reversible thermochromic image so as not to interface with the viewing of the thermochromic image.

The nonthermochromic image that may be used in the present invention can be formed of any of a number of presently known and extensively used inks. The reversible thermochromic printed image may be formed of any known reversible themochromic ink or dye that consists of the combination of an electron-donating color former and an electron-accepting color developer. A preferred reversible thermochromic ink is described in U.S. Pat. No. 4,028,118.

The reversible thermochromic display of the present invention finds many applications since it ensures an almost instantaneous reversible color change to red, blue, yellow, green, orange and purple, as well as many colors of delicate shades (by modifying the composition) within a specific temperature range. A plurality of images can be printed one on top of another on the support by any of a variety of known printing techniques such as gravure, screen and offset printing.

BRIEF DESCRIPTION OF THE DRAWINGS

A preferred embodiment of a method of producing a reversible thermochromic display in accordance with the present invention will hereunder be described with reference to a structure consisting of one nonthermochromic image layer and two thermochromic image layers as shown in the accompanying FIGS. 1 to 6, of which:

FIG. 1 is a plan view of the display wherein only the nonthermochromic image is rendered viewable and the two reversible images remain achromatic;

FIG. 2 is a plan view showing the case where one of the two reversible images indicated in FIG. 4 has developed a color;

FIG. 3 is a plan view showing the case where both reversible thermochromic images have developed color;

FIG. 4 is a cross-sectional view of FIG. 1;
FIG. 5 is a cross section of FIG. 2; and
FIG. 6 is a cross-sectional view of FIG. 3.

DESCRIPTION OF THE PREFERRED EMBODIMENTS

In FIGS. 1 through 6, reference numeral 1 represents a support, 2 is a nonthermochromic image layer, 3-1 is a first reversible thermochromic image layer providing a latent image, 3-2 is the same layer providing a color image, 4-1 is a second reversible thermochromic image layer providing a latent image, and 4-2 is the same layer providing a color image.

The mechanism by which the embodiment shown in FIGS. 1 to 6 achieves the intended object is shown in the graph of FIG. 7 wherein the visual density is plotted on the y-axis and the temperature on the x-axis. In FIG. 7, reference numeral 2 indicates the visual density of the nonthermochromic image, 3 indicates the profile of a color change in the first reversible thermochromic image that occurs due to a temperature change, 4 indicates the profile of a color change in the second reversible thermochromic image due to a temperature change, $T_1$ indicates a point at which the straight line 2 intersects the profile curve 3, $T_2$ indicates the intersection of the two profile curves 3 and 4, $t_1$ through $t_3$ indicate three temperature ranges, and a, b and c each represent the difference in visual density between two adjacent color images at a specific temperature.

Details of the embodiment shown in FIGS. 1 to 6 will now be described. On the support 1 are formed two overlapping reversible thermochromic image layers 3-1 and 4-1 that develop color at low temperatures to provide the visual density of a deep color. On these two thermochromic image layers, a nonthermochromic image layer 2 is formed. In the case of FiG. 1, the nonthermochromic image 2 provides a viewable image "A"

in the temperature range $t_1$. In the case of FIG. 2, the colored reversible thermochromic image 3-2 provides a viewable image "B" in the lower temperature range $t_2$. In the case of FIG. 3, the colored reversible thermochromic image 4-2 provides a viewable image "C" in the still lower temperature range $t_3$.

Referring now to FIG. 7, the first and second reversible thermochromic images 3 and 4 are latent in the temperature range of $t_1$ so that their visual density is lower than that of the nonthermochromic image 2 by the difference a. Therefore, in the temperature range $t_1$, only the nonthermochromic image 2 is visible (see FIG. 1). In the temperature range $t_2$, the first colored thermochromic image 3-2 presents a higher visual density than the nonthermochromic image 2 (difference b) and becomes more visible than the latter (see FIG. 2). In the temperature range $t_3$, the second colored thermochromic image 4-2 presents a higher visual density than colored image 3-2 (difference c) and becomes more visible than both nonthermochromic image 2 and first colored image 3-2 (see FIG. 3).

Therefore, if the temperature range $t_1$ includes room temperature, only the letter "A" becomes visible at room temperature, and as the temperature decreases to $t_2$ and to $t_3$, the letters "B" and "C" become successively visible. If the temperature range $t_2$ includes room temperature, only the letter "B" is visible at room temperature, whereas "A" is visible in the higher temperature range $t_1$ and "B" is visible in the lower temperature range $t_3$. If the temperature range $t_3$ includes room temperature, the letter "C" is visible at room temperature, whereas "B" and "A" become successively visible when the temperature increases to ranges $t_2$ and $t_1$.

In the embodiment shown in FIGS. 1 to 6, the nonthermochromic image is combined with two thermochromic images that develop color at lower temperatures. In other embodiments, the nonthermochromic image may be combined with thermochromic images that develop color at higher temperature, or alternatively, only thermochromic images may be formed on the support. In these modifications, the advantages of the present invention are also obtained.

More specific examples of the production of the display of the present invention will now be described.

(1) A paste-on label was made by the following procedure: The word "CHILL" was formed on a white support in a conventional pale blue ink by gravure printing. On the layer of that word, the words "READY TO DRINK" were printed in a thermochromic ink that turns blue at a temperature of 10° C., and on the layer of these words, the words "TOO COLD" were printed in a thermochromic ink that turns black at a temperature lower than 4° C.

(2) A paste-on label was made by the following procedure: the word "WARM" was formed on a pale yellow support in a conventional orange ink by screen printing. On the layer of that word, the words "READY TO DRINK" were printed in a thermochromic ink that changes to a magenta color at a temperature above 60° C.

(3) A paste-on label was made by the following procedure: The words "RIGHT TEMPERATURE" were printed on a white support in a green yellow ink by offset printing. On the layer of these words, the word "LOW" was printed in a thermochromic ink that turns to a deep blue color at a temperature below 4° C., and on the layer of that word, the word "HIGH" was printed in a thermochromic ink that changes to a deep magenta color at a temperature above 50° C.

(4) A thermochromic image was prepared by the following procedure: A reversible thermochromic image that turns red below 4° C. to produce the word "ENOUGH" was printed on a white support. On the left side of the layer of that word and adjacent thereto, a nonthermochromic pale blue image reading "CHILL" was formed by gravure printing. On the layer of this word, a reversible thermochromic image that turns to a deep blue color below 10° C. so as to produce the word "CHILLED" was formed.

(5) A temperature-indicating label was produced by the following procedure: The words "READY TO EAT" were formed on a white coated paper support in a thermochromic ink that changes to a pale magenta color at subzero temperatures. On the layer of these words, the words "TOO COLD" were screen-printed in a thermochromic ink that turns to a deep magenta color at a temperature lower than $-15°$ C.

(6) A temperature-indicating label was produced by the following procedure: One surface of a polypropylene film was treated by corona discharge. The words "RIGHT TEMPERATURE" were gravure-printed on the treated surface of the film in a thermochromic ink that changes to a pale green color at a temperature lower than 20° C. On the layer of these words, the words "TOO COLD" were printed in a thermochromic ink that turns deep green at a temperature below 10° C. The other side of the polypropylene film was provided with a backing layer in a white ink. The resulting assembly was laminated.

(7) A paste-on label was made by the following procedure: The words "READY TO DRINK" were offset printed on a white support in a thermochromic ink that turns green-yellow at a temperature above 60° C. On the layer of these words, the words "TOO HOT" were printed in a thermochromic ink that turns black at a temperature above 80° C.

Each of the labels produced distinct images successively at the appropriate temperature below or above a predetermined temperature. The images so produced were darker than the images on the other layers and hence were more visible than the latter. The color change was reversible and consistent results were obtained in repeated experiments.

In the embodiments and examples shown, the printed images consisted of letters of the alphabet. However, they may be effectively combined with geometric or decorative patterns. If desired, such patterns above may be used. The display of the present invention may be used in a temperature indicator or various toys. As already mentioned, the support is not limited to a sheet, and any material that has good receptivitiy to ink or dye may be used as the support.

We claim:

1. In a method for forming a reversible thermochromic display, the improvement comprising: forming a plurality of overlapping colored image layers on a support, at least one of said layers providing reversible thermochromic image, said layers being so arranged to provide images having different visual densities, and the image on one of said layers being visible at any particular temperature range, and upon temperature change, the image on any reversible thermochromic layer becoming paler or darker than the densities of other images to develop an image more discernible from said already visible image.

2. The method according to claim 1, wherein one of said colored image layers provides a nonthermochromic image which is paler than said thermochromic image when developed.

3. The method according to claim 1, wherein all of said overlapping image layers provide reversible thermochromic images having different thermochromic temperatures.

* * * * *